UNITED STATES PATENT OFFICE.

EDOUARD WILLEMS, OF ANTWERP, BELGIUM.

MANUFACTURE OF BRICKS, &c.

SPECIFICATION forming part of Letters Patent No. 638,370, dated December 5, 1899.

Application filed June 29, 1897. Serial No. 642,886. (No specimens.)

*To all whom it may concern:*

Be it known that I, EDOUARD WILLEMS, a citizen of Belgium, residing at Antwerp, Belgium, have invented certain new and useful Improvements in the Manufacture of Bricks and Similar Objects Made of Clay, of which the following is a specification.

My invention relates to a composition of matter to compose an enamel applicable to bricks and ornaments of all kinds made by the baking of figuline clay—that is to say, clay which becomes red after being burned.

The said invention consists in the process of manufacturing an enamel applicable to all products made from figuline clay, consisting in first melting together silica, alumina, and alkaline matter, and, secondly, adding to such mixture while melted one or more metallic oxids, substantially as hereinafter set forth and claimed.

The above-mentioned enamel is composed of the following ingredients: silica, alumina, alkali, and metallic oxids.

This enamel may be white and can possess all colors. These different colors depend upon the metallic oxid which is added to the melting mixture. For instance, oxid of zinc will give a white enamel, and oxid of cobalt with oxid of iron will give dark green.

Having fully described my invention, what I claim, and desire to secure by Letters Patent, is—

The process of manufacturing an enamel applicable to all products made from figuline clay, consisting in first melting together silica, alumina and alkaline matter, and second adding to such mixture while melted one or more metallic oxids, substantially as set forth.

EDOUARD WILLEMS.

Witnesses:
   AD STURM,
   RÉMY LEON.